No. 789,434.

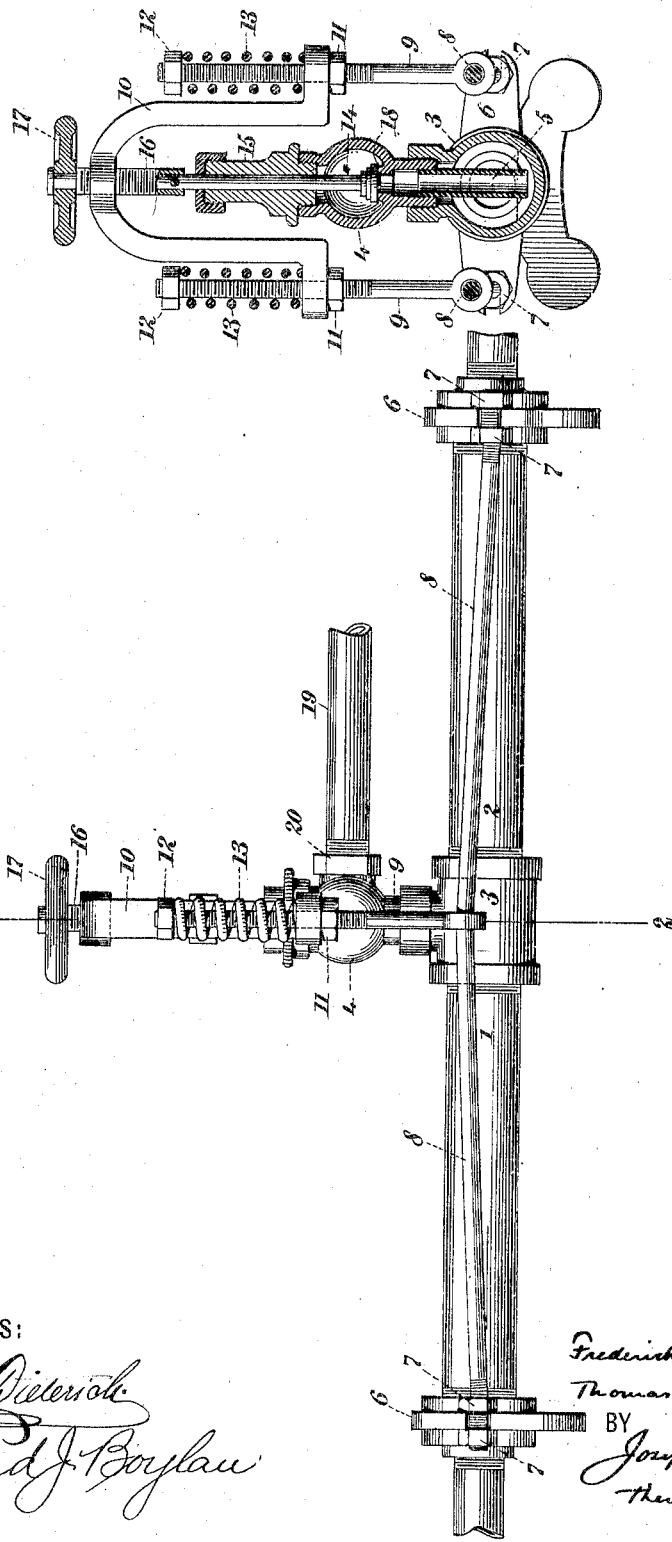

Patented May 9, 1905.

UNITED STATES PATENT OFFICE.

FREDERICK D. KOEHLER AND THOMAS W. MONAHAN, OF NEW YORK, N. Y.

STEAM-TRAP.

SPECIFICATION forming part of Letters Patent No. 789,434, dated May 9, 1905.

Application filed February 24, 1903. Serial No. 144,618.

*To all whom it may concern:*

Be it known that we, FREDERICK D. KOEHLER and THOMAS W. MONAHAN, citizens of the United States, residing in the borough of Richmond, city of New York, county of Richmond, and State of New York, have invented jointly new and useful Improvements in Steam-Traps, of which the following is a specification.

Our invention relates to automatic steam-traps and similar devices designed to be operated by the contraction or expansion of pipes or a part of the trap connected with a steam system. It is an improvement on our steam-trap described and claimed in our Patent No. 729,359, dated May 26, 1903, for improvements in steam-traps.

The purpose of our present invention is to provide simple means for adjusting or setting and regulating the trap, to provide convenient means for venting it at will, to enable the parts to be assembled easily, and to be readily removable for cleaning or repairs.

Figure 1 of the drawings is a side view of the trap. Fig. 2 is a sectional view on the line 2 2 of Fig. 1.

Referring to the drawings, 1 and 2 are two sections of pipe screwed into the T-piece 3. The angle-valve 4 is screwed into the top of T-piece 3, and the tube 5 extends downward therefrom to near the bottom of T-piece 3. The brackets 6 are screwed on each of the sections of pipe 1 and 2. Between the brackets 6 and secured thereto by nuts 7 extend on either side of pipe-sections 1 and 2 the bent rods 8, which are engaged by the vertical rods 9, extending upward through holes in the ends of the yoke 10. Below the yoke 10 on rods 9 are the nuts 11, and at the upper ends of rods 9 are the nuts 12, both nuts being adjustable on the threaded portion of rods 9. Encircling rods 9 between the ends of yoke 10 and the nuts 12 are the springs 13. The valve-stem 14 extends through the bonnet 15 and is connected to the screw 16, which projects through the middle of yoke 10 and terminates in the adjusting wheel or handle 17. 18 is the valve-seat. The pipe 19 extends from the outlet 20 of valve 4.

The operation of the device is as follows: As water from the system collects in pipe-sections 1 and 2 the pipe cools and contracts, carrying brackets 6 toward each other and buckling or bending rods 8, so that they rise in the middle, shoving up vertical rods 9, whose nuts 11 raise the yoke 10, and therewith the valve-stem 14, to raise the valve from its seat 18. The water is then forced from pipe-sections 1 and 2 up through tube 5, through valve 4, and outlet-pipe 19. As the water leaves pipe-sections 1 and 2 steam enters, expanding the pipe by its higher temperature, so that brackets 6 separate, pulling rods 8 nearer a straight line and lowering rods 9, with their nuts 11, until the valve 4 is reseated. Excessive expansion of the pipe will merely cause nuts 11 to be withdrawn below the ends of yoke 10, and the valve will be held to its seat by spring-pressure until contraction of the pipe brings nuts 11 up to the ends of yoke 10 to raise the same, unseating the valve, as above explained. The vertical movement of rods 9 is effective to actuate valve 4 only while nuts 11 are in contact with and exerting pressure upon or withdrawing it from the ends of yoke 10. The tube 5, extending to near the bottom of T-piece 3, forms a water seal, so that steam entering pipe-sections 1 and 2 has time to expand the same to close the outlet-valve before water is entirely expelled and steam escapes. It will be seen that a very slight expansion or contraction of pipe-sections 1 and 2 will cause a much greater movement of rods 9 and valve-stem 14. By having both brackets 6 secured to the pipe the entire expansion or contraction thereof is availed of. The greater the angle in the rods 8 the quicker will be the operation of the device. Care should be taken, however, not to arrange the rods 8 too near a straight line. In case of a sudden increase of pressure the valve, which is spring-pressed to its seat, will open, as in the case of an ordinary relief or snifting valve. Beyond one of the brackets 6 at the end of the trap not connected with the steam system a removable plug may be screwed into the end of the pipe. When the plug is removed, steam will blow through to clear the pipe. To set the trap, the wheel 17 is turned by hand to raise the valve from its seat 18. The water in the trap will then be expelled through outlet 19. After the water has been expelled and some steam has blown through, the pipes 1 and 2 will expand to a condition normal with the heat of the steam system. The operator then reverses wheel 17 until he feels the seating of the valve. The valve is then set. When new water collects in the trap, the pipes 1 and 2 will be contracted by the reduction of temperature and the valve opened automatically to allow the water to be ejected, when the steam will cause the automatic closing of the valve again, as before explained. If it be desired to adjust the trap so that it will not operate to discharge water until the temperature is more reduced, the operator continues turning the wheel 17 after the valve is set farther in the same direction. The yoke 10 will then be lifted by the screw 16, so that its ends will be raised the desired distance from nuts 11. When this is done, the contraction of the pipes 1 and 2, due to the advent of water, will not be effective to open the valve until such contraction has raised nuts 11 up to the ends of yoke 10—that is to say, the desired amount of contraction will be made ineffective to raise the valve, with the result that the trap may be adjusted to operate at the selected temperature. The higher the yoke is raised from the nuts 11 the cooler the outflowing water will be. The valve may also be opened by hand to vent the system for any purpose or to clean the valve-seat by turning handle 17 in the reverse direction, so that the valve will be raised from its seat by the screw 16.

To take the apparatus apart in order to clean or renew the valve, the nuts 12 are first unscrewed and then the bonnet 15, when the yoke 10 and stem 14 may be raised and removed.

The nuts 11 are shown adjustable on the threaded portion of rods 9; but permanent flanges or shoulders may be employed instead, since the adjustment of the trap is accomplished by means of the wheel 17, as before explained.

What we claim as new, and desire to secure by Letters Patent, is—

1. A receiving-pipe, an outlet-pipe, a valve therefor, a water seal, a slightly-bent rod on each side of the receiving-pipe and secured thereto at the ends the bends in each rod being in the same direction, uprights secured to the middle of the rods, springs on said uprights tending to close the valve, shoulders on said uprights adapted to engage the ends of a yoke, a yoke attached by a screw to the valve-stem and hand-operated means whereby the valve may be seated or unseated and whereby the ends of the yoke may be adjusted as desired in relation to said shoulders on said uprights.

2. A receiver adapted to expand or contract in accordance with the temperature of its contents, two bent rods secured at either end to said receiver in the line of its greatest expansion and contraction, uprights secured to the middle of the two rods, a valve, a yoke connected by a screw to the valve-stem, springs on said uprights held between the ends thereof and the ends of said yoke, projections on said uprights adapted to raise the valve-stem when the receiver contracts and to be withdrawn when the receiver expands, and an adjusting-handle whereby the valve may be seated or unseated and whereby the ends of the yoke may be adjusted as desired in relation to said projections on said uprights.

3. A receiver, a valve controlling a vent therefrom, buckled rods secured at both ends to the receiver, means interposed between the valve and the buckled rods whereby a slight expansion or contraction of the receiver causes a multiplied change in the buckling of the rods to shift the valve, means to provide spring-pressure tending to hold the valve to its seat and an adjusting device under the control of a single handle whereby the buckling of the rods may be made ineffective during a part of their movement to shift the valve and whereby the valve may be seated or unseated.

4. A receiver, a slightly-buckled rod secured at both ends to the receiver, a valve under spring-pressure tending to seat it, means operated by the buckling of the rod for seating and unseating the valve and an adjusting device under the control of a single handle whereby a portion of the buckling movement of the rod may be made ineffective to shift the valve.

5. A receiver, a valve controlling a vent therefrom, a buckled device secured at both ends to the receiver whereby a slight expansion or contraction of the receiver causes a multiplied movement at the center of the buckled device, means interposed between said buckled device and said valve whereby the valve is actuated by the buckling, a spring tending to hold the valve to its seat but allowing it to be unseated by excessive pressure in the receiver and an adjusting device under the control of a single handle whereby the valve may be seated or unseated and whereby a selected portion of the movement of the buckled device may be made ineffective to shift the valve.

6. A receiving-pipe, an outlet-pipe, a valve therefor, a slightly-bent rod on each side of the receiving-pipe and secured thereto at the ends the bend in each rod being in the same direction, uprights secured to the middle of the rods, springs on said uprights tending to close the valve, projections on said uprights adapted to engage the ends of a cross-piece connected with the valve-stem to open the valve, and an adjusting-handle by means of which the valve may be seated or unseated and the ends of said cross-piece may be raised a selected distance from the projections on said uprights when the valve is closed.

7. A receiver adapted to expand or contract in accordance with changes in the temperature of its contents, a buckled device secured at both ends to the receiver whereby a slight expansion or contraction of the receiver causes a multiplied movement in the buckled device, a valve controlling an outlet from the receiver, means interposed between the valve and the buckled device whereby the valve is shifted by the buckling, and adjusting means under the control of a single handle whereby a desired portion of the contraction and expansion of the receiver may be made ineffective to shift the valve and whereby the valve may be seated or unseated.

8. A receiver adapted to expand or contract in accordance with changes in the temperature of its contents, a valve controlling an outlet from said receiver, means whereby the expansion and contraction of the receiver seats and unseats the valve, and regulating means operated by a single handle whereby a desired portion of the expansion and contraction of the receiver is made ineffective to move the valve and whereby the valve may be seated or unseated.

9. A receiver adapted to expand or contract in accordance with changes in the temperature of its contents, a spring-pressed valve controlling an outlet from said receiver, means whereby the expansion and contraction of the receiver seats and unseats the valve, and adjusting means under the control of a single handle whereby the time of movement of the valve may be hastened and delayed at will and whereby the valve may be seated or unseated irrespective of the automatic control of the valve.

10. A receiver adapted to expand or contract in accordance with changes in the temperature of its contents, a spring-pressed valve controlling an outlet from said receiver, means whereby the expansion and contraction of the receiver seats and unseats the valve, and adjusting means under the control of a single handle whereby the period during which expansion or contraction of the trap will not move the valve, may be varied at will and whereby the valve may be seated or unseated irrespective of the automatic control of the valve.

11. In an expansion-trap a spring-pressed valve, means to unseat the valve automatically when the trap contracts, means to seat the valve automatically when the trap expands, and means under the control of a single wheel or handle whereby a desired portion of the contraction of the trap may be made ineffective to move the valve.

12. In an expansion-trap a spring-pressed valve, means to unseat the valve automatically when the trap contracts, means to seat the valve automatically when the trap expands, means under the control of a single wheel or handle whereby the valve may be seated or unseated irrespective of the automatic operation of the valve and means under the control of the same wheel or handle whereby a desired portion of the contraction of the trap may be made ineffective to move the valve.

In testimony whereof we have signed our names to this specification, in the presence of two subscribing witnesses, this 20th day of February, 1903.

FREDERICK D. KOEHLER.
   THOMAS W. MONAHAN.

Witnesses:
 MINNIE KAUFFMAN,
 JOSEPH A. STETSON.